United States Patent
Ning et al.

[15] 3,686,308
[45] Aug. 22, 1972

[54] 5-LOWER ALKANOYL-2-GLYCYLAMINO-BENZOPHENONES

[72] Inventors: Robert Ye-Fong Ning, West Caldwell; Leo Henryk Sternbach, Upper Montclair, both of N.J.

[73] Assignee: Hoffman-La Roche Inc., Nutley, N.J.

[22] Filed: April 15, 1970

[21] Appl. No.: 28,935

[52] U.S. Cl..........260/562 N, 260/140, 260/239 BD, 260/326 N, 260/456 A, 260/519, 260/562 B, 260/570 AB, 424/244
[51] Int. Cl.............................................C07c 103/42
[58] Field of Search............260/562, 239 BD, 71, 73

[56] References Cited

UNITED STATES PATENTS

| | | | |
|---|---|---|---|
| 3,435,041 | 3/1969 | Drukker | 260/562 |
| 3,136,815 | 6/1964 | Reeder et al. | 260/562 |

*Primary Examiner*—Henry R. Jiles
*Assistant Examiner*—Harry I. Moatz
*Attorney*—Samuel L. Welt, Jon S. Saxe, Bernard S. Leon and William G. Isgro

[57] ABSTRACT

The present invention relates to processes for the preparation of 7-lower alkanoyl-1,4-benzodiazepin-2-ones. These compounds are known to be useful as muscle relaxants, sedatives and anticonvulsants.

4 Claims, No Drawings

5-LOWER ALKANOYL-2-GLYCYLAMINO-BENZOPHENONES

DETAILED DESCRIPTION OF THE INVENTION

The present invention relates to a process for preparing 7-lower alkanoyl benzodiazepines. Such 7-lower alkanoyl benzodiazepin-2-ones are of the formula

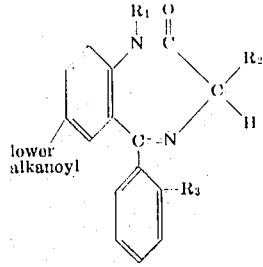

wherein $R_1$ and $R_2$ are selected from the group consisting of hydrogen and lower alkyl; and $R_3$ is selected from the group consisting of hydrogen and halogen.

The term "lower alkyl" as utilized herein includes both straight and branched chain hydrocarbon groups having one to seven, most preferably one to four, carbon atoms in the chain. Representative of these are methyl, ethyl, propyl, isopropyl, butyl and the like. The term "halogen" as used throughout the disclosure is intended to connote all four halogens, namely, chlorine, bromine, iodine and fluorine, unless otherwise specified. "Lower alkanoyl" as utilized herein represents the acyl moiety of a lower alkanoic acid (i.e., a lower alkyl $$\overset{O}{\underset{}{\overset{\|}{C}}}$$

grouping) preferably, having one to seven, most preferably one to four carbon atoms in the lower alkyl portion of the acyl moiety such as acetyl, propionyl, butyryl, pentylcarbonyl and the like.

A preferred embodiment of the novel process of the present invention can be illustrated diagrammatically by the following flow sheet. Preferred compounds in the diagrammatical flow sheet are those wherein $R_2$ is hydrogen. Also preferred are compounds in the diagrammatical flow sheet wherein $R_3$ is selected from the group consisting of hydrogen and halogen. When $R_3$ is halogen, it is preferably fluorine.

The character X in the diagrammatical flow sheet connotes any leaving group which is suitable for the purposes of the present invention. Thus, any leaving group or portion of another grouping which can be readily removed in accordance with the objects of the present invention can be suitably employed. Preferably, X is selected from the group consisting of halogen, most suitably, chlorine, bromine and iodine, a phenyl sulfonyloxy group such as benzene sulfonyloxy or tosyloxy, a lower alkyl sulfonyloxy group such as mesyloxy, phthalamido and carbobenzoxyamino.

FLOW SHEET

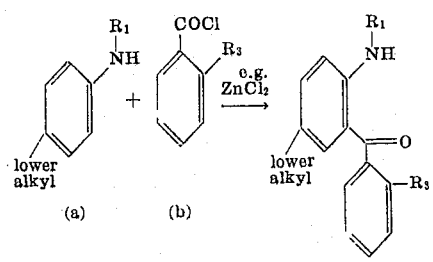

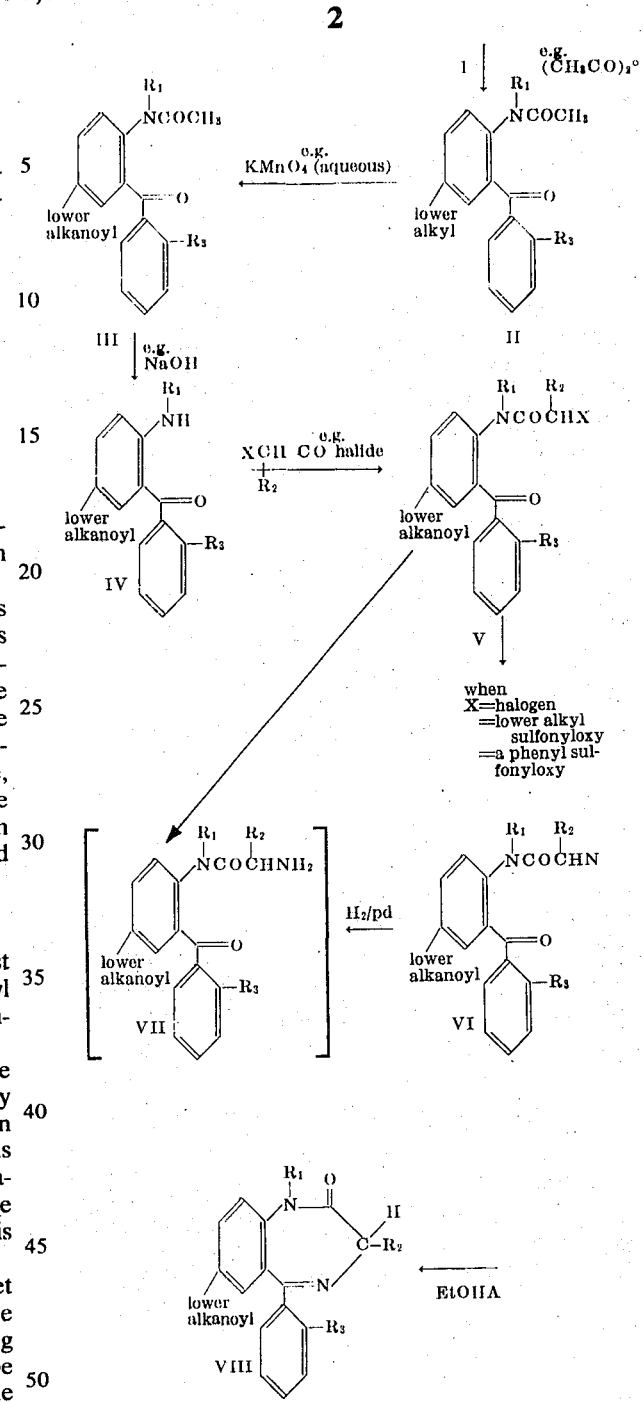

In the first stage of the process illustrated diagrammatically above, a p-lower alkyl aniline (a) is reacted with a compound (b) selected from the group consisting of benzoyl halide and a halo-benzoyl halide, preferably, having the halo group in the ortho position in the presence of a catalyst such as zinc chloride whereby to obtain a compound of the formula I.

Preferred benzoyl group containing compounds of the formula (b) include benzoyl chloride, o-chlorobenzoyl chloride o-fluorobenzoyl chloride and the like.

The reaction of a benzoyl halide of the formula (b) with a para-lower alkyl aniline of the formula (a) in the presence of zinc chloride is suitably effected at elevated temperatures. It is especially preferred to conduct the reaction at a temperature of above about 130° C. The reaction should be performed in an anhydrous medium. Thus, it can be conducted in the absence of any solvent outside of the reactants themselves or alternatively, it can be conducted in the presence of an inert organic solvent such as benzene and the like. Suitably, the reaction is effected utilizing a benzoyl halide of the formula (b) above as the reaction medium.

The so-obtained compound of the formula I above is converted into the corresponding compound of the formula II above by treating the compound of the formula I above with a suitable nitrogen protecting group. This group functions to prevent the nitrogen atom on the 2-amino function from participating in further reactions until it is desired. Nitrogen protecting groups are well known and can be represented by a lower alkanoyl group provided by acetic anhydride, acetyl chloride and the like. Suitably, this reaction is effected in the presence of an inert organic solvent such as benzene, ether, a halogenated hydrocarbon such as methylene chloride and the like. Temperature and pressure are not critical to a successful performance of this process step. Thus, the reaction can be effected at room temperature or at elevated temperatures. However, in a preferred aspect, the reaction is conducted under reflux conditions.

The next stage of the process aspect illustrated diagrammatically above (i.e., the conversion of a compound of the formula II into the corresponding compound of the formula III), is effected by oxidizing a compound of the formula II. In a preferred embodiment, the oxidation is effected utilizing a buffered solution of potassium permanganate as the reagent for oxidation. Of course, any oxidating reagent which is suitable for the purposes of the present invention can also be conveniently employed.

The oxidation with potassium permanganate occurs upon the treatment of a compound of the formula II with dilute aqueous solution (0.1–5 percent) of potassium permanganate. Suitably, for every one mole of a compound of the formula II, there is present from about one to about four moles of permanganate in the reaction medium. The reaction is effected at a temperature of from about 0° to about 80°, most preferably from about 50° to about 70°.

As is evident from the above, this stage of the reaction is effected in an excess of water provided by the dilute aqueous solution of permanganate and this excess can serve as the solvent medium. However, other suitable solvents can also be utilized as the medium in which the reaction may be conducted. While potassium permanganate is described as being the preferred oxidizing reagent, it is, of course, to be understood that other permanganates such as lithium, sodium, calcium and magnesium can similarly be utilized with equal efficaciousness for the purposes of the present invention.

In the next stage of the process illustrated diagrammatically above (III → IV), the so-obtained compound of the formula III is subjected to hydrolyzing conditions wherein to obtain a 2-amino group containing compound. The compound of the formula III can be hydrolyzed utilizing standard procedures, e.g., by the use of water miscible solvents such as dioxane, tetrahydrofuran, ethanol and the like in the presence of an acid such as hydrochloric acid or a base such as an alkali metal hydroxide (preferably sodium hydroxide).

The so-obtained 2-amino-5-lower alkanoyl benzophenone of the formula IV can be converted into the corresponding compound of the formula VIII by a wide variety of procedures.

For example, the so-obtained 2-amino-5-lower alkanoyl benzophenone of the formula IV above can be treated with a halo-lower alkanoyl leaving group containing compound of the formula

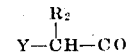

halide wherein Y is halogen, lower alkyl sulfonyloxy, e.g., mesyloxy or a phenyl sulfonyloxy group, e.g., benzene sulfonyloxy, or tosyloxy.

Suitable halo-lower alkanoyl halides (i.e., wherein Y is halogen) are preferably represented by chloroacetyl chloride, bromoacetyl bromide, bromoacetyl chloride, bromopropionyl chloride and the like. From the above, it should be evident that the halogen moieties of the above-identified halo-lower alkanoyl halide compounds are preferably selected from the group consisting of chlorine and bromine.

Representative of compounds of the formula

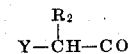

halide wherein Y is lower alkyl sulfonyloxy or a phenyl sulfonyloxy are mesyloxyacetyl chloride and tosyloxyacetyl chloride.

Suitably, this process aspect (i.e., the preparation of a compound of the formula V) wherein X is halogen, lower alkyl sulfonyloxy and a phenyl sulfonyloxy group is effected in the presence of an inert organic solvent such as benzene, ether, methylene chloride and the like. Temperature and pressure are not critical to a successful performance of this step. However, in a preferred aspect, this step is conducted at elevated temperatures, e.g., at about the reflux temperature of the reaction medium.

In one process aspect, the so-obtained compound of the formula V wherein X is halogen, lower alkyl sulfonyloxy, and a phenyl sulfonyloxy group is treated with ammonia and the resulting compound of the formula VII is cyclized without isolation to the corresponding 7-lower alkanoyl benzodiazepine of the formula VIII above.

The compound of the formula VII above need not be isolated prior to cyclizing same but the ring closure thereof to the compound of the formula VIII can be effected in the reaction medium in which the compound of the formula VII was prepared without isolating same or interrupting the reaction sequence before the desired compound of the formula VIII is obtained.

For example, the haloacylamido compound of the formula V above or a mesyloxyacylamido compound of the formula V or a tosyloxyacylamido compound of the formula V can be placed in a lower alkanol suspension of ammonia such as ethanolic ammonia or methanolic ammonia and, subsequently after a period of several hours, for example, overnight, the corresponding 7-lower alkanoyl benzodiazepine represented by the formula VIII can be recovered. The cyclization can be accelerated by heating. In another embodiment, in lieu of methanolic ammonia, the compound of the formula V wherein X is halogen, a lower alkyl sulfonyloxy group or a phenyl sulfonyloxy group can be dissolved in an inert organic solvent such as methylene chloride, carbon tetrachloride, ethers such as tetrahydrofuran, dioxane and ethyl ether, dimethylsulfoxide, dimethylformamide and the like and the resultant solution can be treated with liquid ammonia whereby a compound of the formula VII results. The so-obtained compound of the formula VII, either in crude or more purified form can be added to an inert organic solvent such as a lower alkanol, e.g., methanol, ethanol and the like. By permitting the resultant solution to stand and/or by the application of heat, cyclization to the corresponding compound of the formula VIII occurs.

Compounds of the formula V wherein X is a carbobenzoxy amino grouping can be obtained by reacting a compound of the formula IV above with a carbobenzoxy-glycylating agent such as carbobenzoxy glycine, carbobenzoxy-glycine anhydride and carbobenzoxy-glycyl halide. The carbobenzoxy-glycylation can be conducted at room temperature or at temperatures above or below room temperature.

In one preferred embodiment, the carbobenzoxy-glycylation is effected by condensing carbobenzoxy-glycine with a compound of the formula IV above in the presence of an N,N'-disubstituted-carbodiimide. The reaction can, for example, be carried out at a temperature between about 0° and about 50° C. preferably, at a temperature slightly below room temperature. Advantageously, a solvent is present during the reaction. Among the solvents which can be used for this purpose, there can be included organic solvents, such as, methylene chloride, chloroform, dioxane, tetrahydrofuran, dimethylformamide, acetonitrile and the like, as well as water and mixtures of the above.

In a further aspect of this embodiment of the present invention, the so-obtained compound of the formula V above wherein X is carbobenzoxyamino (e.g., a carbobenzoxy-glycyl-amino-5-acetylbenzophenone) can be converted into the corresponding compound of the formula VII via the treatment thereof with a hydrohalic acid in the presence of acetic acid. This reaction step results in the selective splitting of one of the amide linkages of the carbobenzoxy-glycylamino chain so as to yield a compound of the formula VII. Preferably, there is used as the hydrohalic acid, in this process step, hydrobromic acid. However, other hydrohalic acids such as hydrochloric acid can also be used. The reaction can be performed either in aqueous or anhydrous media. It can be conducted at room temperature or temperatures above or below room temperature. The so-obtained compound of the formula VII can then be converted into the corresponding compound of the formula VIII in the manner described above.

A further embodiment of this process aspect relates to a process for the preparation of a compound of the formula VIII which comprises the steps of treating a 2-carbobenzoxy-glycyl-aminobenzophenone with hydrohalic acid, e.g., hydrobromic acid, in the presence of acetic acid and alkalizing the crude reaction product to a pH of at least 7, e.g., to at least neutrality. Thus, a compound of the formula V wherein X is carbobenzoxyamino can be directly converted into compounds of the formula VIII without isolating an intermediate of the formula VII. As the alkalizing agent, either strong or weak bases can be used, for example, ammonia, sodium carbonate, alkali metal hydroxides such as potassium hydroxides, sodium hydroxides and the like.

In a further process aspect of the present invention, compounds of the formula V above wherein X is phthalimido can be obtained by treating a compound of the formula IV above with a compound of the formula

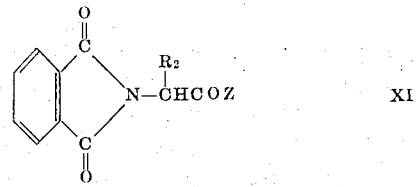

wherein $R_2$ is as above and Z is selected from the group consisting of halogen, preferably, chlorine and bromine in the presence or in the absence of an alkaline halo acid binder. The condensation is carried out in a suitable inert solvent such as a halogenated hydrocarbon, e.g., chloroform and methylene chloride, pyridine and the like. A preferred temperature range for effecting this process aspect is from about room temperature to about the reflux temperature of the solvent utilized.

A compound of the formula V above wherein X is phthalimido can also be obtained by treating the corresponding compound of the formula V wherein X is halogen, lower alkyl sulfonyloxy and aryl sulfonyloxy in a preferred aspect with an alkali metal salt of phthalimide (phthalimide potassium).

The so-obtained compound of the formula V above wherein X is phthalimido can be converted into the corresponding compound of the formula VII by treating the former with hydrazine hydride. Suitably this process is effected in an inert organic solvent. Preferably, one or more molar equivalents of hydrazine hydrate is present in the reaction zone for every one molar equivalent of compound of the formula V wherein X is phthalimido. Temperature and pressure are not critical to a successful performance of this process step. However, elevated temperatures, preferably at about the reflux temperature of the reaction mixture are preferred. Also, for good yields it has been found that the reaction should be conducted in an inert organic solvent such as a lower alkanol, e.g., ethanol. In proceeding accordingly, the compound of the formula VII is obtained and it can be converted directly to the corresponding compound of the formula VIII without isolation of the said compound of the formula VII or interrupting the reaction before the desired benzodiazepin-2-one of the formula VIII is obtained.

In an alternate process step, a compound of the formula V above wherein X is halogen or lower alkyl sulfonyloxy or an aryl sulfonyloxy group is treated with an azide-generating reagent. Representative of azide group-providing agents are alkali metal azides such as sodium azide, potassium azide, lithium azide and alkaline earth metal azides such as calcium azide, ammonium azide and the like. Preferred is sodium azide whereby to obtain the corresponding azide of the formula VI above. In this process step, a compound of the formula V is added to an appropriate organic solvent such as an alkanol, e.g., methanol, an ether such as dioxane and tetrahydrofuran and the like. The resultant solution is then heated at temperatures from slightly above room temperature to about the reflux temperature of the reaction medium, whereby to obtain a compound of the formula VI. The so-obtained compound of the formula VI is then selectively reduced by catalytic hydrogenation utilizing any conveniently available reducing system which may include catalysts, Raney Nickel, and noble metal catalysts such as palladium, platinum and the like, whereby to obtain the corresponding compound of the formula VII. The catalytic hydrogenation is suitably effected in the presence of an inert organic solvent such as an ether, e.g., tetrahydrofuran. In a preferred aspect the resulting compound of the formula VII is dissolved, without isolation from the reaction medium in which it is prepared, in an appropriate inert organic solvent such as ethanol, methanol and the like, and then cyclized to the corresponding compound of the formula VIII as described above.

In still another alternative process embodiment, a compound of the formula VI can be prepared directly from a compound of the formula IV by reacting such compound with a compound of the formula

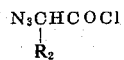

(e.g., azidoacetyl chloride) at a temperature of from about 10° to about 50° C. in the presence of an inert organic solvent such as chloroform.

As indicated above, the compounds of the formula VIII are useful as muscle relaxants, anticonvulsants and sedatives. Such compounds can be formulated into pharmaceutical preparations in admixture with a compatible pharmaceutical carrier and can be administered enterally or parenterally with dosages adjusted to suit the exergencies of a pharmacological situation.

The novel compounds of the formula VIII can be embodied in pharmacological dosage formulations containing from about 0.5 mg. to about 200 mgs. of active substance with dosage adjusted to species and individual requirements (parenteral formulations would ordinarily contain less of the active substance than compositions intended for oral administration). The compounds of the formula VIII can be administered alone or in combination with pharmaceutically acceptable carriers as indicated above in wide variety of dosage forms. For example, solid preparations for oral administration include tablets, capsules, powders, granules, emulsions, suspensions and the like. The solid preparations may comprise an inorganic carrier, e.g., talc or an organic carrier, e.g., lactose and starch. Additives such as magnesium stearate (a lubricant) can also be included. Liquid preparations such as solutions, suspensions or emulsions may comprise the usually diluents such as water, petroleum jelly and the like or a suspension medium such as polyethylene glycols, vegetable oils and the like. They may also contain other additional ingredients such as preserving agents, stabilizing agents, wetting agents, salts for varying the osmotic pressure or buffers, and the like.

The following examples are illustrative but not limitative of the present invention. All temperatures are stated in degrees Centigrade.

EXAMPLE 1

To a solution of 41.7 g. (0.36 moles) of zinc chloride in 175 ml. (1.52 moles) of benzoyl chloride maintained at 140° C., 29.1 g. (0.24 moles) of p-ethylaniline was added portionwise (from a beaker) with stirring. The mixture was heated under reflux at 210°–220° C. for 1 hr. The temperature was then lowered to 140° C., and the excess benzoyl chloride was removed by distillation at water aspirator pressure. Without letting the mixture cool, 100 ml. of 6 N hydrochloric acid was added carefully at about 140° C. and the reaction mixture was stirred and heated under reflux at 140°–160° C. for 20 hrs. The mixture was partially cooled. Methylene chloride (about 300 ml.) was added followed by about 300 ml. water. The mixture was stirred until all solids dissolved. The aqueous layer was extracted two more times with methylene chloride. The combined methylene chloride layers were washed thoroughly with 3N hydrochloric acid, 3N sodium hydroxide and water in this sequence. After drying over anhydrous sodium sulfate and evaporation of methylene chloride a dark gum of 2-amino-5-ethylbenzophenone.

The gum was chromatographed on a column of 500 g. of activity I alumina. Elution with 10 percent ether in benzene gave 2-amino-5-ethylbenzophenone as a gum (single spot on tlc). Crystallization from petroleum ether gave pale yellow plates, m.p. 54°–56°.

EXAMPLE 2

To a solution of 90.0 g. (0.4 moles) of 2-amino-5-ethyl-benzophenone in 400 ml. of benzene was added 84 ml. (91.0 g., 0.8 moles) of acetic anhydride and the reaction mixture was heated under reflux for 45 min.

On cooling the reaction mixture was concentrated in vacuo, to yield a semi-solid. Repeated solution in ethyl acetate followed by evaporation of the solvent gave a deep brown solid. After one recrystallization from ethanol, 2-acetamido-5-ethylbenzophenone in a pale brown amorphous form, was obtained, m.p. 109°–110.5°. Repeated recrystallizations from ethanol gave colorless needles, m.p. 112°–113.5°.

EXAMPLE 3

A three-necked 3 l. flask was charged with 5.0 g. (125 mmoles) of magnesium oxide, 170 ml. (250 mmoles) of concentrated nitric acid and 2 l. of water. To this solution was added 13.3 g. (50 mmoles) of 2-acetamido-5-ethylbenzophenone and 19.5 g. (125 mmoles) of potassium permanganate. The reaction mixture was heated with stirring at 60°±2° C. for 5 hrs.

The reaction mixture was chilled in ice. Manganese dioxide was dissolved by reduction with a stream of gaseous sulfur dioxide. The remaining pale yellow solid was collected and washed with water. After two recrystallizations from ethanol, 2-acetamido-5-acetyl-benzophenone was obtained as colorless needles, m.p. 115°–116°.

EXAMPLE 4

To a solution of 5.6 g. (20 mmoles) of 2-acetamido-5-acetyl-benzophenone in 100 ml. of ethanol was added 100 ml. (0.2 mole) of 2N sodium hydroxide and the mixture was heated under reflux for 3 hrs. On cooling, pale yellow crystals of 5-acetyl-2-aminobenzophenone precipitated. The crystals were collected and washed with ethanol. After recrystallization from benzene-petroleum ether, 5-acetyl-2-aminobenzophenone was obtained as yellow prisms, m.p. 153°–154.5° C.

EXAMPLE 5

Starting with p-fluorobenzoyl chloride and p-ethylaniline, there was obtained 5-acetyl-2-amino-2'-fluorobenzophenone in the manner described in the preceding examples.

EXAMPLE 6

To a solution of 7.2 g. (30 mmoles) of 2-amino-5-acetylbenzophenone in 100 ml. of benzene was added 12.06 g. (60 mmoles) of bromoacetyl bromide and the mixture was heated under reflux for 3 hrs. On cooling, the reaction mixture was washed with ice cold dilute alkali, and water, dried over anhydrous sodium sulfate and evaporated in vacuo to yield a buff colored solid. On recrystallization from benzene-petroleum ether, 5-acetyl-2-(2-bromoacetamido)benzophenone was obtained as a buff colored amorphous acid, m.p. 118°–120° C. A portion of this material on further recrystallization yielded red hexagonal prisms.

In a similar manner by reacting 2-amino-5-acetyl-benzophenone with mesyloxyacetyl chloride, there can be obtained 5-acetyl-2-(2-mesyloxyacetamido)benzophenone.

Also, in a similar manner by reacting 2-amino-5-acetylbenzo-phenone with tosyloxyacetyl chloride, there can be obtained 5-acetyl-2-(2-tosyloxyacetamido)benzophenone.

EXAMPLE 7

To a solution of 3.0 g. (8.4 mmoles) of 5-acetyl-2-(2-bromo-acetamido)benzophenone in 120 ml. of methanol, was added 1.08 g. (16.8 mmoles) of sodium azide in one portion. The reaction mixture was heated on a steam bath for 15 min. On cooling, 5-acetyl-2-(2-azidoacetamido)benzophenone precipitated as pale pink microprisms. Upon recrystallization from ethanol, pink microprisms were obtained, m.p. 144°–145° C.

In a similar manner upon the treatment of 5-acetyl-2-(2-tosyloxyacetamido)benzophenone or 5-acetyl-2-(2-mesyloxyacetamido) benzophenone with sodium azide, there can be obtained 5-acetyl -2-(2-azidoacetamido)benzophenone.

EXAMPLE 8

To a solution of 2.0 g. (6.2 mmoles) of 5-acetyl-2-(2-azidoacetamido)benzophenone in 125 ml. of tetrahydrofuran was added 350 mg. of 10 percent palladium on carbon. The mixture was hydrogenated at one atmosphere for 2 hr. and yielded 5-acetyl-2-glycylamino-benzophenone. The catalyst was removed by filtration through a pad of Celite, and the solution was evaporated to dryness. The pale yellow solid obtained was dissolved in 125 ml. of ethanol and heated to a reflux for 2 hrs. Evaporation of ethanol gave an oil. Upon treatment of the oil with benzene-petroleum ether, 7-acetyl-1,3-dihydro-5-phenyl-2H-1,4-benzodiazepin-2-one, precipitated as pale yellow powder, m.p. 184°–186.5.°

EXAMPLE 9

A solution of 2.4 g. (6.8 mmoles) of 5-acetyl-2-(2-bromo-acetamido)benzophenone in 10 ml. of methylene chloride was added to 25 ml. of liquid ammonia at −78°C., chilled in a dry ice-acetone bath giving 5-acetyl-2-glycylaminobenzophenone. After stirring for 2 hrs., the dry ice bath was removed, and the liquid ammonia allowed to evaporate. The methylene chloride layer was washed with water, dried over anhydrous sodium sulfate, and evaporated to dryness. The oily residue, which contained 5-acetyl-2-glycylaminobenzophenone, was dissolved in 40 ml. of ethanol and heated to reflux for 1 hr. Evaporation of ethanol and repeated recrystallization of the residue from benzene-petroleum ether gave 7-acetyl-1,3-dihydro-5-phenyl-2H-1,4-benzodiazepin-2-one, as a yellow powder.

EXAMPLE 10

To a solution of 30 mmoles of 2-amino-5-acetyl-2'-fluorobenzophenone in 100 ml. of benzene was added 60 mmoles of bromoacetyl bromide and the mixture was heated under reflux for 3 hrs. On cooling, the reaction mixture was washed with ice cold dilute alkali, and water, dried over anhydrous sodium sulfate and evaporated in vacuo to yield a buff colored solid. On recrystallization from benzene-petroleum ether,5-acetyl-2-(2-bromoacetamido) -2'-fluorobenzophenone was obtained.

EXAMPLE 11

To a solution of 8.4 mmoles of 5-acetyl-2-(2-bromoacetamido) -2'-fluorobenzophenone in 120 ml. of methanol, was added 16.8 mmoles of sodium azide in one portion. The reaction mixture was heated on a steam bath for 15 min. On cooling and concentration, 5-acetyl-2-(2-azidoacetamido)-2'-fluorobenzophenone precipitated.

EXAMPLE 12

A solution of 2.4 g. 6.8 mmoles of 5-acetyl-2-(2-bromoacetamido)-2'-fluorobenzophenone in 10 ml. of methylene chloride was added to 25 ml. of liquid ammonia at −78° C., chilled in a dry ice-acetone bath giving 5-acetyl-2-glycylamino-2'-fluorobenzophenone. After stirring for 2 hrs., the dry ice bath was removed, and the liquid ammonia allowed to evaporate. The methylene chloride layer was washed with water, dried over anhydrous sodium sulfate and evaporated to dryness. The oily residue which contained 5-acetyl-2-glycylamino-2'-fluorobenzophenone was dissolved in 40 ml. of ethanol and heated to reflux for 1 hr. Evaporation of ethanol and repeated recrystallization of the residue from ether petroleum ether gave 7-acetyl-1,3-di-hydro-5-(2-fluorophenyl)-2H-1,4-benzodiazepin-2-one as light yellow prisms, m.p. 211°–213°.

EXAMPLE 13

To a solution of 2.3 gms. of 5-acetyl-2-aminobenzophenone and 2.1 gms. of carbobenzoxyglycine in 25 ml. of tetrahydrofuran, 2.2 gms. of N,N'-dicyclohexylcarbodiimide was added. After stirring for several minutes, dicyclohexylurea began to crystallize.

Stirring was continued to two hours and dicyclohexylurea was then filtered off. The filtrate was then treated with 2 ml. of acetic acid to decompose any excess N,N'-dicyclohexylcarbodiimide. After 15 minutes additional solid was removed by filtration. The filtrate was taken to dryness in vacuo and the residue was dissolved in benzene and washed successively with 1N hydrochloric acid, water and 5 percent sodium bicarbonate and then dried over sodium sulfate. The benzene layer was concentrated and hexane added to turbidity. On seeding 4-acetyl-2-benzoylphenylcarbamoylmethyl)carbamic acid benzyl ester crystallized.

EXAMPLE 14

A solution of 4.5 gms. of (4-acetyl-2-benzoylphenylcarbamoylmethyl)carbamic acid benzyl ester in 45 ml. of 20 percent hydrobromic acid in acetic acid was stirred for thirty minutes at room temperature. Anhydrous ether (175 ml.) was then carefully added. After pouring off the supernatant, the residue was stirred with water and ether, cooled in an ice bath and made sightly alkaline with ammonia. The ether layer was dried over sodium sulfate, filtered, some benzene added and the resulting solution concentrated in vacuo to small volume. On addition of hexane to the residue 5-acetyl-2-glycylaminobenzophenone was obtained. By adding the so-obtained compound to ethanol and refluxing, it was cyclized to 5-acetyl-1,3-dihydro-5-phenyl-2H-1,4-benzodiazepin-2-one.

EXAMPLE 15

A solution of 3.1 gms. of (4-acetyl-2-benzoylcarbamoylmethyl)carbamic acid benzyl ester in 30 ml. of 20 percent hydrobromic acid in glacial acetic acid was stirred for 45 minutes at room temperature. To the resultant solution, 175 ml. of anhydrous ether was added. After several minutes the ether solution was decanted. The resultant 5-acetyl-2-glycylaminobenzophenone was not isolated but about 155 ml. of ether was added to the residue and after chilling in an ice bath, 10 percent sodium hydroxide was added until the mixture was made alkaline. The ether layer was then separated, washed twice with water and dried over sodium sulfate. After filtration, the ether solution was concentrated to dryness in vacuo. The residue was crystallized from benzene to yield 7-acetyl-1,3-dihydro-5-phenyl-2H-1,4-benzodiazepin-2-one.

EXAMPLE 16

To 125 ml of a chloroform solution of phthalimidoacetyl chloride, there was added 5 g. of 5-acetyl-2-aminobenzophenone. After refluxing for 3 hours the reaction mixture was allowed to stand for 48 hours at room temperature. Removal of the solvent in vacuo left crystalline 2-phthalimidoacetamido-5-acetyl benzophenone.

EXAMPLE 17

A solution of 2-phthalimidoacetamido-5-acetylbenzophenone (0.5 mgs.) in 95 percent ethanol (25 ml.) containing hydrazine hydrate (0.17 gms.) was heated under reflux for two hours. About 10 ml. of ethanol was then distilled off. The so-obtained reaction mixture which contained 5-acetyl-2-glycylaminobenzophenone was cooled to room temperature and filtered. The filtrate was acidified by addition of 5 percent hydrochloric acid. The mixture was then warmed to about 80°. After so warming, the mixture was cooled so that the temperature was brought to about room temperature. The so-obtained mixture was made alkaline with dilute sodium hydroxide and exhaustively extracted with methylene chloride. The extract was washed with water, the solvent removed by distillation and the remaining 7-acetyl-1,3-dihydro-5-phenyl-2H-1,4-benzodiazepin-2-one was recrystalllized from benzene-petroleum ether as a pale yellow powder.

EXAMPLE 18

A 500 ml. three necked flask was charged with a solution of 41.0 g. (0.3 moles) of zinc chloride in 175 ml. (1.25 moles) of benzoyl chloride. The solution was heated up to 150°C., and 29.8 g. (0.2 moles) of p-n-butylaniline was added portionwise with vigorous stirring, the temperature being maintained at 150° C. The temperature was then raised to (210°–220° C.) and the reaction mixture was heated under reflux for 0.75 hr., till most of the gaseous HCl was expelled.

The reaction mixture was cooled to 140°, the excess benzoyl chloride was distilled off at aspirator pressure; without letting the mixture cool, 100 ml. of 6N hydrochloric acid was added carefully and the mixture was heated under reflux for 20 hrs.

The hot resinous materials were partitioned between water and methylene chloride till all the solids dissolved. The aqueous phase was extracted twice more with methylene chloride, the combined organic layers were washed twice with 250 ml. portions of 3N HCl 3N NaOH, and water in this sequence, dried over anhydrous sodium sulfate, evaporated in vacuo to yield a greenish yellow oil. The oil was essentially 2-amino-5-butylbenzophenone.

EXAMPLE 19

To 2.53 (0.01 mole) of 2-amino-5-butylbenzophenone as the oil obtained in the preceding example in 15 ml. of benzene, was added 3.0 ml. (0.03 moles) of acetic anhydride, and the reaction mixture was stirred at room temperature for 2 hrs.

The solvent was then evaporated in vacuo, the dark solid obtained was dissolved in 10 ml. of dimethylformamide, and treated with water to yield a light brown solid (76°–77° C.). After recrystallizations from ether-pentane, 2-acetamido-5-butylbenzophenone was obtained in a light yellow amorphous form, m.p. 79.5°–81.5°.

EXAMPLE 20

A 250 ml. 3-necked flask was charged with a solution of 290 mg. (7.2 mmoles) of magnesium oxide in 150 ml. of water, 1.0 ml. (15 mmoles) of concentrated nitric acid, 1.00 g. (3.6 mmoles) of 2-acetamido-5-butylbenzophenone and 1.10 g. (7.2 mmoles) of potassium permanganate. The reaction mixture was heated with stirring for 8 hrs. at 60±2° C. On cooling, gaseous sulfur was passed through the dark brown mixture to dissolve the manganese dioxide. The remaining pale yellow solid was collected and washed with water. This solid was dissolved in methylene chloride and washed with aqueous sodium bicarbonate. The methylene chloride layer was dried over anhydrous sodium sulfate and evaporated to dryness. Trituration of the residual solid followed by chilling gave 2-acetamido-5-butyryl-benzophenone as colorless needles, m.p. 125°–126.5°.

The so-obtained 2-acetamido-5-butyryl-benzophenone can be converted in the manner described in Examples 4, 6 and 9 into 7-butyryl-1,3-dihydro-5-phenyl-2H-1,4-benzodiazepin-2-one by conversion to 2-amino-5-butyrylbenzophenone which is then converted to 2-(2-bromoacetamido)-5-butyryl-benzophenone which upon treatment with ammonia is then converted into 5-butyryl-2-glycylaminobenzophenone which in turn cyclizes to the desired 7-butyryl-benzodiazepin-2-one.

We claim:
1. A compound of the formula

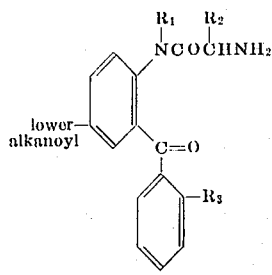

wherein $R_1$ and $R_2$ are selected from the group consisting of hydrogen and lower alkyl and $R_3$ is selected from the group consisting of hydrogen and halogen.

2. A compound as in claim 1 wherein $R_2$ is hydrogen.

3. A compound as in claim 2 of the formula 5-lower alkanoyl-2-glycylaminobenzophenone.

4. A compound of the formula 5-acetyl-2-glycylaminobenzo-phenone.

* * * * *